US008517140B2

(12) United States Patent
West et al.

(10) Patent No.: US 8,517,140 B2
(45) Date of Patent: Aug. 27, 2013

(54) INDEPENDENT REAR SUSPENSION KIT

(75) Inventors: Vaughn E. D. West, McHenry, IL (US);
Thomas E. Brown, Ceresco, NE (US)

(73) Assignee: Heidts Acquisition, LLC, Wauconda, IL (US)

( * ) Notice: Subject to any disclaimer, the term of this patent is extended or adjusted under 35 U.S.C. 154(b) by 0 days.

(21) Appl. No.: 13/458,187

(22) Filed: Apr. 27, 2012

(65) Prior Publication Data

US 2012/0326410 A1 Dec. 27, 2012

Related U.S. Application Data

(60) Provisional application No. 61/480,196, filed on Apr. 28, 2011.

(51) Int. Cl.
*B60K 17/16* (2006.01)
*B60G 3/20* (2006.01)

(52) U.S. Cl.
USPC ............. 180/360; 280/124.128; 280/124.135; 280/124.153; 280/124.156; 280/124.109; 180/378

(58) Field of Classification Search
USPC .................. 280/124.135, 124.136, 785, 787, 280/124.125, 124.128, 124.148, 124.153, 280/86.751, 86.758, 124.156, 124.107, 124.109; 180/377, 378, 360
See application file for complete search history.

(56) References Cited

U.S. PATENT DOCUMENTS

| 3,189,118 | A |   | 6/1965  | Arning |
|-----------|---|---|---------|--------|
| 3,871,467 | A | * | 3/1975  | Senft et al. ..................... 180/359 |
| 4,556,238 | A | * | 12/1985 | Matschinsky .......... 280/124.135 |
| 4,717,175 | A | * | 1/1988  | Arai et al. .................... 280/5.523 |
| 5,102,159 | A | * | 4/1992  | Sato et al. .................. 280/86.75 |
| 6,105,984 | A | * | 8/2000  | Schmitz et al. ......... 280/124.136 |
| 6,746,032 | B2 | * | 6/2004 | Seki ....................... 280/124.135 |
| 6,755,429 | B1 | * | 6/2004 | Buchwitz et al. ....... 280/124.109 |
| 7,661,689 | B2 | * | 2/2010 | Kinugasa ................ 280/124.135 |
| 8,096,567 | B2 | * | 1/2012 | Cordier .................. 280/124.109 |
| D666,949 | S  | * | 9/2012 | West et al. ................. D12/160 |
| 2003/0111812 | A1 | * | 6/2003 | Carlstedt et al. ......... 280/124.16 |
| 2007/0235972 | A1 | * | 10/2007 | Schmitz ................. 280/124.156 |
| 2012/0031688 | A1 | * | 2/2012 | Safranski et al. ............ 180/54.1 |

OTHER PUBLICATIONS

CWI Jag IRS Suspension, Concours West Industries, Retrieved from Internet on Oct. 5, 2010 <URL: http://www.cwiinc.com/jagsuspensions.htm>.

(Continued)

*Primary Examiner* — Drew Brown
(74) *Attorney, Agent, or Firm* — Michael Best & Friedrich LLP

(57) ABSTRACT

An independent rear suspension kit includes first and second mounting brackets configured to be fastened to a chassis of a vehicle, a cross-member interconnecting the first and second brackets, a differential housing supported by the cross-member, first and second upper control arms pivotably coupled to the cross-member, first and second lower control arms pivotably coupled to the differential housing, a first upright pivotably coupled to the first upper control arm and the first lower control arm, and a second upright pivotably coupled to the second upper control arm and the second lower control arm.

20 Claims, 4 Drawing Sheets

(56) References Cited

OTHER PUBLICATIONS

Factory Five Racing Parts Catalog, Independent Rear Suspension, Retrieved from Internet on Oct. 5, 2010 <URL: http://parts.factoryfive.com/newcatalog/chassis/irs.htm>.

Independent Rear Suspensions, Kugel Komponents, Retrieved from Internet on Oct. 28, 2010 <URL: http://www.kugelkomponents.com/rear_suspension/rearsuspension.php>.

Mustang IRS System Product Page, C.T.M. Engineering, Retrieved from Internet on Aug. 25, 2010 <URL: http://mustangirs.com/products.php>.

How to install Independent Rear Suspension in Musclecars, Hot Rod, Retrieved from Internet on Oct. 5, 2010 <URL: http://www.hotrod.com/howto/hrdp_0712_irs_for_musclecars/bolt_in_kits.html>.

* cited by examiner

INDEPENDENT REAR SUSPENSION KIT

CROSS-REFERENCE TO RELATED APPLICATIONS

This application claims priority to U.S. Provisional Patent Application No. 61/480,196 filed on Apr. 28, 2011, the entire content of which is incorporated herein by reference.

FIELD OF THE INVENTION

The present invention relates to vehicles, and more particularly to vehicle suspension systems.

BACKGROUND OF THE INVENTION

Rear-wheel drive passenger vehicles are typically designed with a solid-axle suspension system for transferring an engine's torque to the rear wheels of the vehicle. Such solid-axle suspension systems typically include an axle housing, a differential located in the axle housing, and two axles interconnecting the differential and the respective rear wheels of the vehicle. The axle housing is typically supported relative to the vehicle's chassis by multiple springs to permit the axle housing to move upwardly and downwardly relative to the vehicle's chassis as the vehicle is moving in response to irregularities in the driving surface.

SUMMARY OF THE INVENTION

Solid-axle suspension systems, however, inherently compromise a vehicle's performance or handling to some extent because a solid-axle suspension system is responsive to inputs received from either of the rear wheels of the vehicle. For example, should the driver-side rear wheel encounter an irregularity in a driving surface (e.g., a pothole), the driver-side rear wheel would be caused to move downwardly relative to the vehicle's chassis, and the passenger-side rear wheel may be caused to move upwardly or tilt inwardly, thereby losing camber, in response to the input provided on the driver-side rear wheel.

The invention provides an independent rear suspension kit for a vehicle originally equipped with a solid-axle suspension system to increase the performance and handling of the vehicle. Independent rear suspension systems, as described in more detail below, substantially isolate a vehicle's rear wheels such that an input to the system by one of the wheels does not affect the other of the wheels.

The invention provides, in one aspect, an independent rear suspension kit for a vehicle. The kit includes first and second mounting brackets configured to be fastened to a chassis of the vehicle, a cross-member interconnecting the first and second brackets, a differential housing supported by the cross-member, first and second upper control arms pivotably coupled to the cross-member, first and second lower control arms pivotably coupled to the differential housing, a first upright pivotably coupled to the first upper control arm and the first lower control arm, and a second upright pivotably coupled to the second upper control arm and the second lower control arm.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
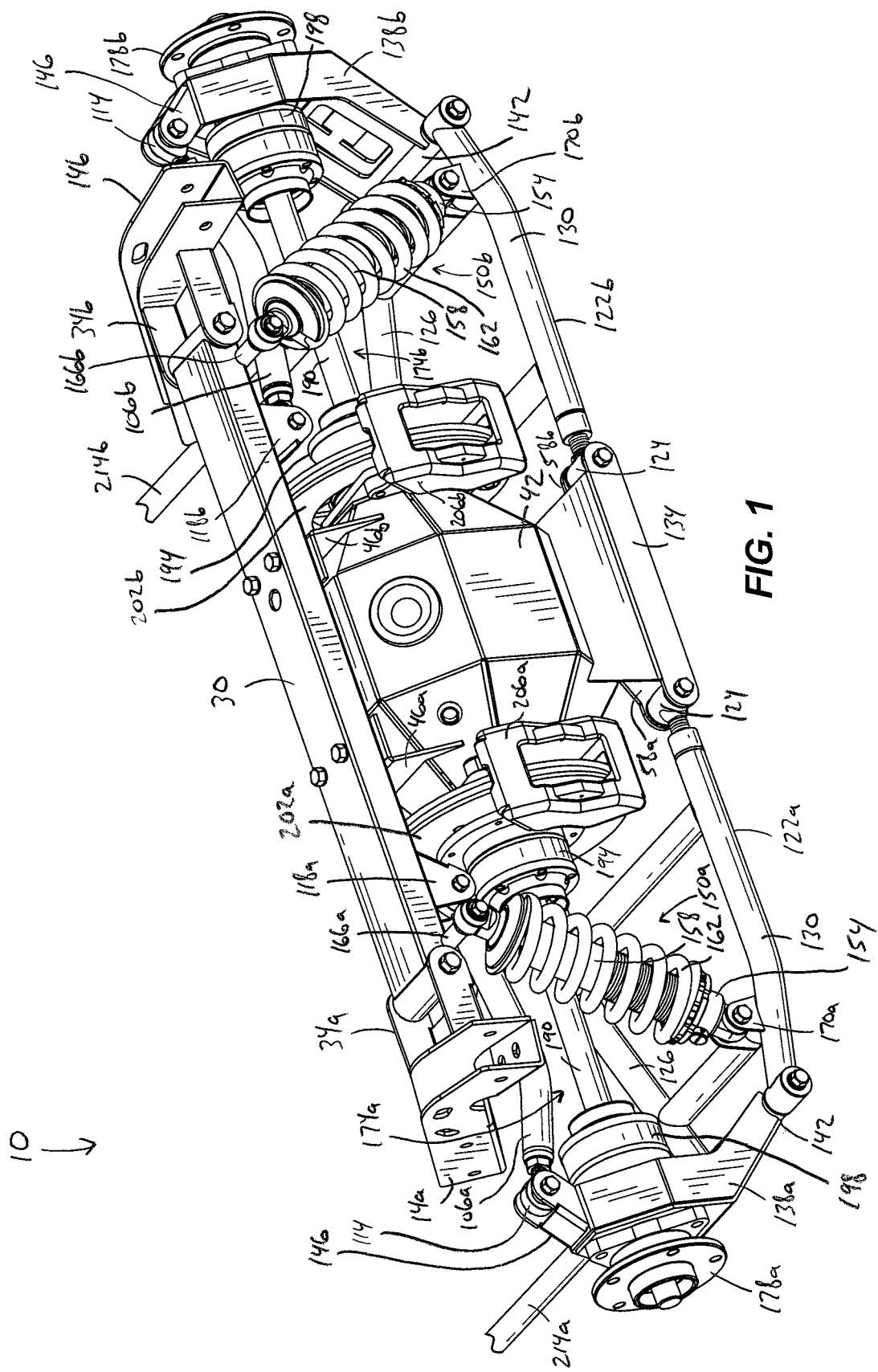
FIG. 1 is a rear perspective view of an independent rear suspension kit of the invention.
Figure 2:
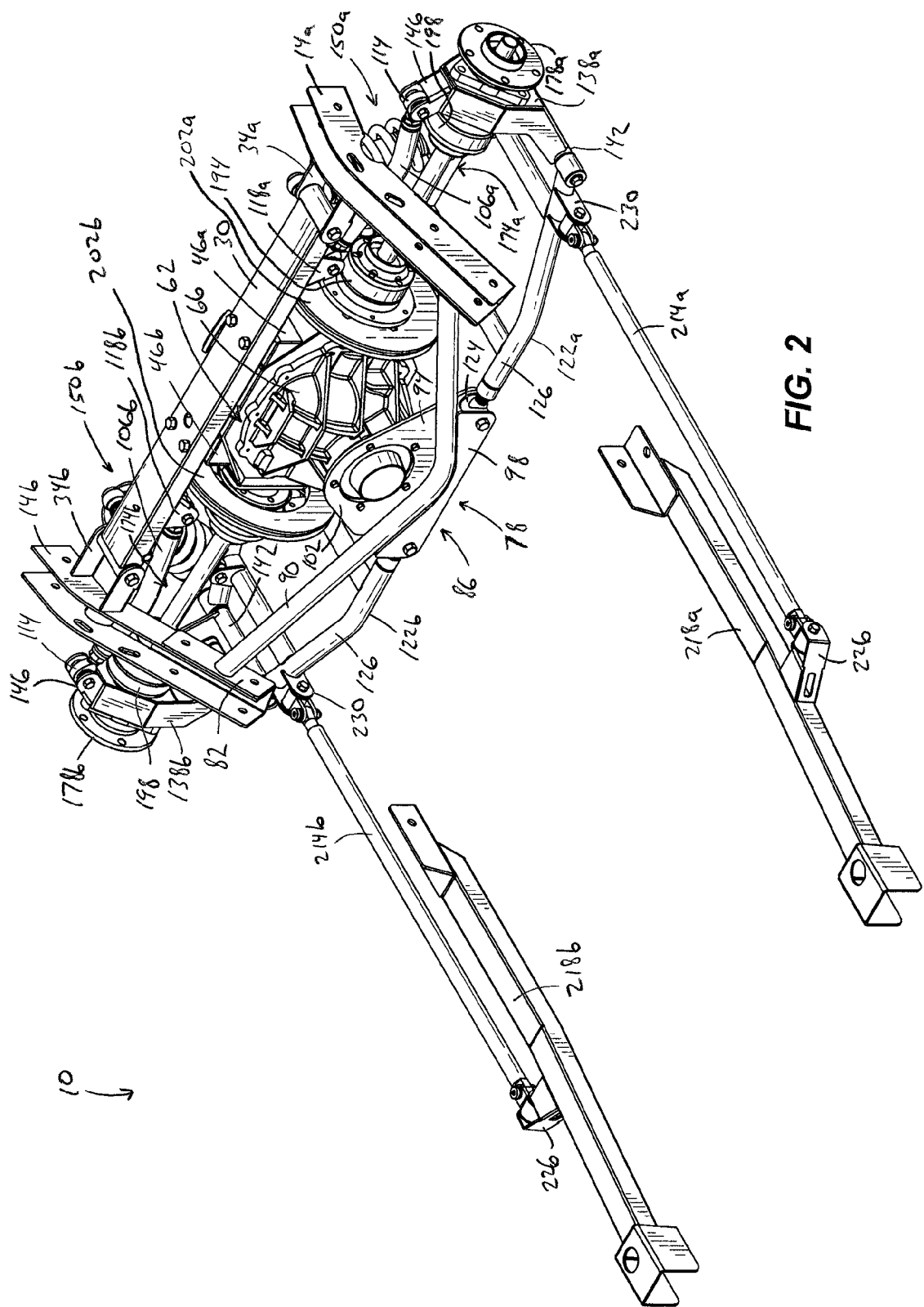
FIG. 2 is a front perspective view of the independent rear suspension kit of FIG. 1.
Figure 4:
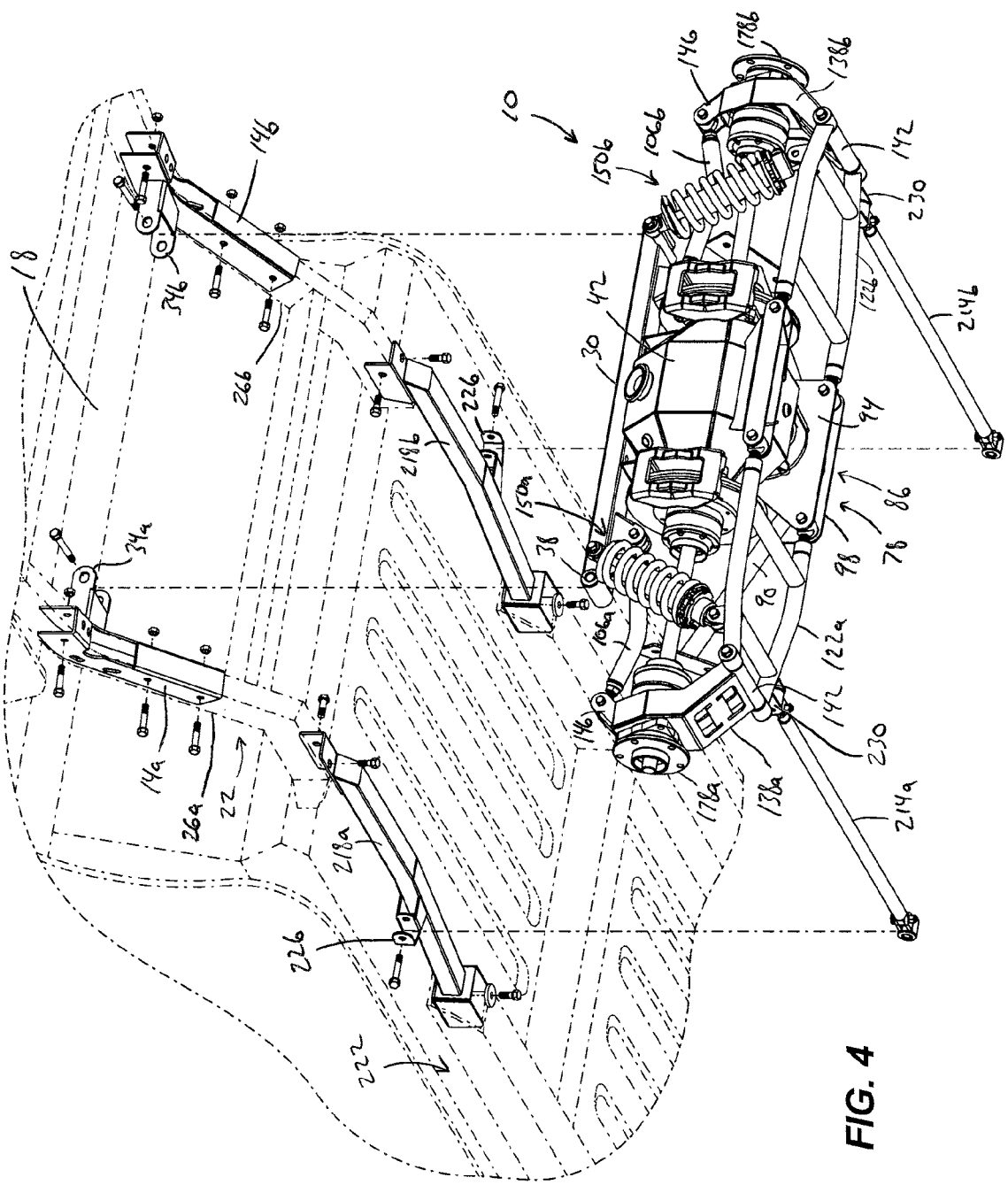
FIG. 4 is a bottom perspective view of the independent rear suspension kit of FIG. 1 assembled to a vehicle chassis.

FIGS. 1 and 2 illustrate an independent rear suspension kit 10 for a vehicle originally equipped with a solid-axle suspension system. As such, the kit 10 may be used for converting the vehicle from a solid-axle suspension system to an independent rear suspension system. Alternatively, the kit 10 may be used as original equipment in a specialty vehicle (e.g., a tube-frame race car) to provide an independent rear suspension system. The kit 10 includes first (i.e., driver-side) and second (i.e., passenger-side) mounting brackets 14a, 14b configured to be fastened to a chassis 18 of the vehicle (FIG. 4). With continued reference to FIG. 4, the vehicle includes a rear sub-frame 22 to which the brackets 14a, 14b are attached. Particularly, each of the brackets 14a, 14b is shaped to follow the contour of parallel rails 26a, 26b of the rear sub-frame 22. As such, the shape of the brackets 14a, 14b dictates the placement or location of the brackets 14a, 14b on the respective rails 26a, 26b. The brackets 14a, 14b are fastened to the rails 26a, 26b using conventional threaded fasteners to clamp the brackets 14a, 14b to the respective rails 26a, 26b. Alternatively or additionally, the brackets 14a, 14b may be welded to the rails 26a, 26b of the rear sub-frame 22. The illustrated kit 10 in FIGS. 1 and 2 is specially configured for use with a Chevrolet Camaro, model years 1967-1969. The shapes of some of the components, however, may be modified to adapt the kit 10 for use with different vehicles.

Figure 3:
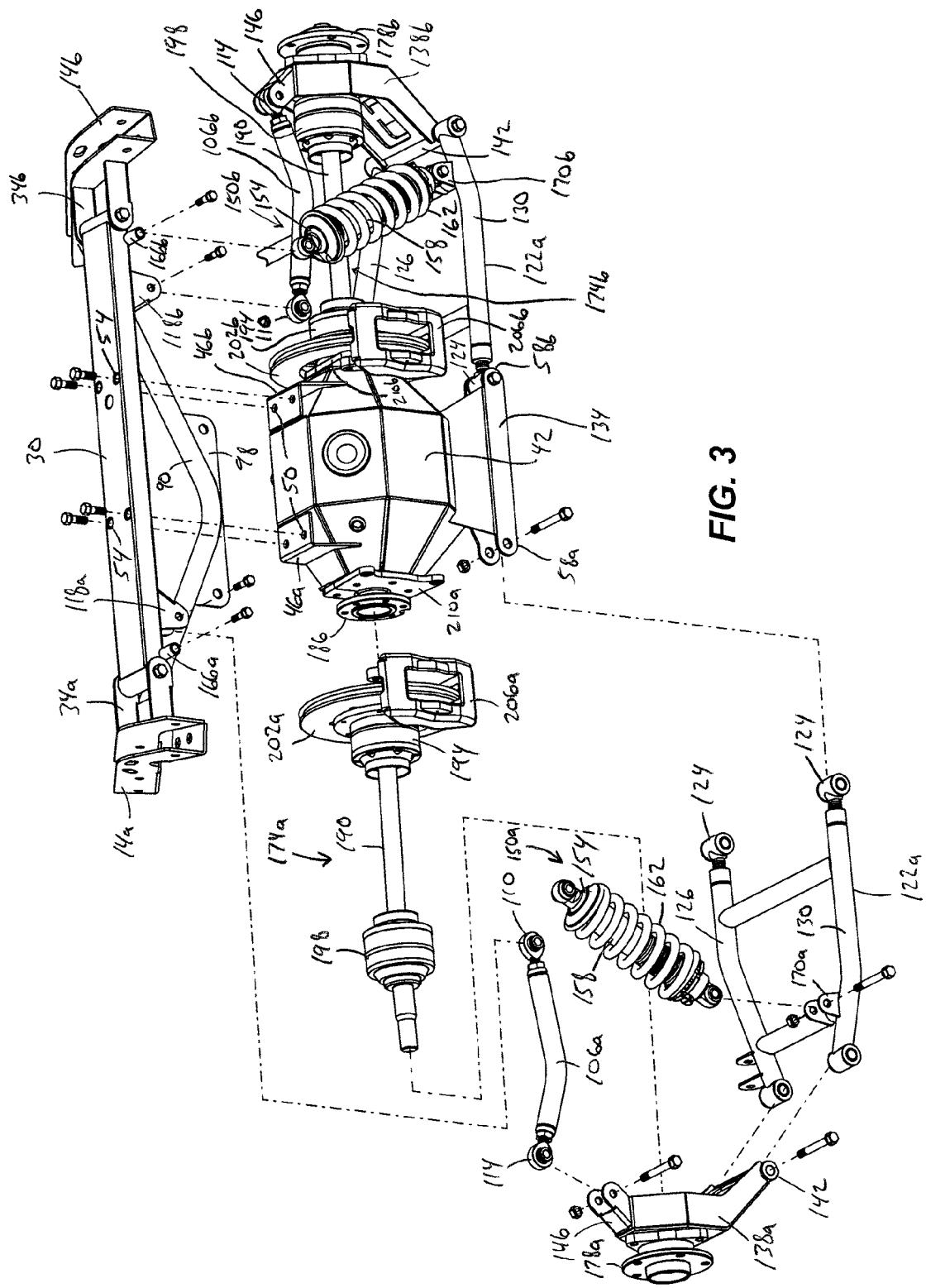
FIG. 3 is an exploded, rear perspective view of the independent rear suspension kit of FIG. 1.

With reference to FIGS. 1-3, the kit 10 also includes a cross-member 30 interconnecting the first and second brackets 14a, 14b. Particularly, each of the brackets 14a, 14b includes a mount 34a, 34b (FIG. 4), and opposed ends of the cross-member 30 are fastened to the respective mounts 34a, 34b to secure the cross-member 30 to the rear sub-frame 22 of the vehicle's chassis 18. A rubber or polymeric cylindrical bushing 38 is received in each end of the cross-member 30 to interconnect the ends of the cross-member 30 with the respective mounts 34a, 34b on the brackets 14a, 14b to attenuate vibration transferred to the vehicle's chassis 18. Conventional threaded fasteners are received in the bushings 38 and are utilized to connect the opposed ends of the cross-member 30 with the respective mounts 34a, 34b.

With reference to FIG. 1, the kit 10 further includes a differential housing 42 supported by the cross-member 30. The differential housing 42 includes spaced flanges 46a, 46b (FIG. 3) having a plurality of threaded holes 50. A corresponding plurality of threaded fasteners are inserted through respective apertures 54 in the cross-member 30 and received in the threaded holes 50 to support the differential housing 42 from the cross-member 30. The differential housing 42 also includes two arms 58a, 58b, the purpose of which is described in detail below, extending from the bottom of the differential housing 42. The arms 58a, 58b are welded to the differential housing 42; however, in an alternative embodiment of the kit 10 the differential housing 42 and the arms 58a, 58b may be integrally formed as a single piece (e.g., by machining from a billet, by casting, etc.). As shown in FIG. 2, a "third member" or a differential unit 62 is attached to the differential housing 42 in a conventional manner. The differential unit 62 includes a case 66 and a differential (not shown) at least partially received within the case 66. The differential unit 62 includes an input yoke (not shown) to receive torque from the vehicle's engine (e.g., via a drive shaft, also not shown).

With continued reference to FIG. 2, the kit 10 also includes a saddle 78 having opposed first and second ends interconnecting the first and second brackets 14a, 14b, respectively. Particularly, the saddle 78 includes end plates 82 that are fastened to the respective brackets 14a, 14b. The saddle 78 also includes a middle portion 86 coupled to the differential housing 42 to further secure the differential housing 42 to the rear sub-frame 22 of the vehicle's chassis 18. The saddle 78 includes a V-shaped tube 90 and the middle portion 86 of the saddle 78 includes opposed, parallel plates 94, 98 at least one of which is welded to the tube 90. The plate 94 also includes a flange 102 that is fastened to the case 66 of the differential unit 62 which, in turn, is fastened to the differential housing 42.

With reference to FIGS. 1-3, the kit 10 further includes first and second upper control arms 106a, 106b pivotably coupled to the cross-member 30. Each of the first and second upper control arms 106a, 106b includes opposed ends to which threaded spherical rod ends 110, 114 are attached (FIG. 3). The inboard rod end 110 on each of the upper control arms 106a, 106b is pivotably coupled to the cross-member 30 via an upper control arm mount 118a, 118b and a conventional threaded fastener. In the illustrated construction of the kit 10, the upper control arms 106a, 106b are shaped with a curvature to provide clearance for the mounting brackets 14a, 14b and the rails 26a, 26b of the rear sub-frame 22. Alternatively, in a vehicle configuration in which no clearance issues are posed by the mounting brackets 14a, 14b or the rear sub-frame 22, the upper control arms 106a, 106b may be substantially straight. The length of each of the upper control arms 106a, 106b is adjustable to adjust a camber angle of the respective rear wheels. Particularly, the upper control arms 106a, 106b may be independently lengthened or shortened by adjusting the depth to which the spherical rod ends 110, 114 are threaded into the respective ends of the control arms 106a, 106b.

With reference to FIGS. 1-3, the kit 10 also includes first and second lower control arms 122a, 122b pivotably coupled to the differential housing 42 and the saddle 78. Each of the lower control arms 122a, 122b is generally A-shaped and includes a forward tube 126 and a rearward tube 130 that taper toward each other. The forward tube 126 of each of the lower control arms 122a, 122b is pivotably coupled to the saddle 78 (i.e., via the plates 94, 98) using a conventional threaded fastener, while the rearward tube 130 of each of the lower control arms 122a, 122b is pivotably coupled to the respective arms 58a, 58b of the differential housing 42 using a conventional threaded fastener. The lower control arms 122a, 122b also include tie rod end bushings 124 pivotably coupling the lower control arms 122a, 122b to the differential housing 42 and the saddle 78. The bushings 124 are rotatable with respect to the remainder of the lower control arms 122a, 122b to adjust the overall length of the lower control arms 122a, 122b. Accordingly, the tie rod end bushings 124 may be adjusted to vary the track width or the toe of the vehicle in which the kit 10 is installed. The tie rod end bushings 124 may include rubber or polymeric bushings to attenuate vibration transferred to the differential housing 42 and the vehicle's chassis 18. With reference to FIG. 1, the kit 10 further includes a tie link 134 interconnecting the first and second arms 58a, 58b of the differential housing 42 to increase the rigidity of the arms 58a, 58b. In the illustrated embodiment of the kit 10, the tie link 134 is welded to the differential housing 42 and defines at least a portion of each of the arms 58a, 58b.

With reference to FIGS. 1-3, the kit 10 further includes a first upright 138a pivotably coupled to the first upper control arm 106a and the first lower control arm 122a, and a second upright 138b pivotably coupled to the second upper control arm 106b and the second lower control arm 122b. As shown in FIG. 3, the first and second uprights 138a, 138b each include a lower pivot mount 142 positioned between the respective tubes 126, 130 of each of the lower control arms 122a, 122b. A single threaded fastener is inserted through the lower pivot mount 142 to interconnect the respective tubes 126, 130 of each of the lower control arms 122a, 122b to pivotably couple the uprights 138a, 138b to the respective lower control arms 122a, 122b. Each of the uprights 138a, 138b also includes an upper pivot mount 146 to which the outboard rod ends 114 of the respective upper control arms 106a, 106b are pivotably coupled using conventional threaded fasteners. As described above, the length of the upper control arms 106a, 106b is adjustable to permit adjustment of the camber angle of each of the uprights 138a, 138b, and therefore the rear wheels.

With reference to FIGS. 1 and 3, the kit 10 also includes a first suspension member 150a interconnecting the cross-member 30 and the first lower control arm 122a, and a second suspension member 150b interconnecting the cross-member 30 and the second lower control arm 122b. In the illustrated construction of the kit 10, the first and second suspension members 150a, 150b are each configured as coil-over shocks 154 having an adjustable shock 158 surrounded by a coil spring 162. As would be understood by one of ordinary skill in the art, both the preload on the coil spring 162 and the damping coefficient of the shock 158 are independently adjustable to change the performance of the coil-over shocks 154. An upper end of each of the coil-over shocks 154 is pivotably coupled to a respective upper shock mount 166a, 166b attached to the cross-member 30 (see also FIG. 4). A conventional threaded fastener is utilized to pivotably couple each of the coil-over shocks 154 with the respective upper shock mounts 166a, 166b on the cross-member 30. With reference to FIGS. 1 and 3, the lower control arms 122a, 122b include respective lower shock mounts 170a, 170b attached to the rearward tube 130 of each of the lower control arms 122a, 122b. Like the upper shock mounts 166a, 166b, a conventional threaded fastener is utilized to pivotably couple the lower end of each of the coil-over shocks 154 with the respective lower shock mounts 170a, 170b on the lower control arms 122a, 122b. As such, the vertical forces acting on the rear wheels while the vehicle is in operation are transferred to the vehicle's chassis 18 through the uprights 138a, 138b, the lower control arms 122a, 122b, the coil-over shocks 154, the cross-member 30, and the brackets 14a, 14b.

With continued reference to FIGS. 1 and 3, the kit 10 further includes a first stub axle assembly 174a extending between the first upright 138a and the differential housing 42, and a second stub axle assembly 174b extending between the second upright 138b and the differential housing 42. The inboard ends of the respective stub axle assemblies 174a, 174b are coupled to the differential to receive torque from the differential when the vehicle is in operation, while the outboard ends of the respective stub axle assemblies 174a, 174b are coupled to respective hubs 178a, 178b that are rotatably supported by the uprights 138a, 138b. The hubs 178a, 178b each include a plurality of axle studs (not shown) for securing the rear wheels to the hubs 178a, 178b (e.g., using lug nuts). As such, torque from the differential is transferred to the respective rear wheels of the vehicle through the respective stub axle assemblies 174a, 174b and the hubs 178a, 178b.

With reference to FIG. 3, the first and second stub axle assemblies 174a, 174b each include a stub axle 186 rotatably supported by the differential housing 42 and engaged with the differential. The first and second stub axle assemblies 174a, 174b also each include an axle shaft 190 having a first end and a second end, a first constant-velocity joint 194 coupling the stub axle 186 with the first end of the axle shaft 190, an output shaft (not shown) coupled for co-rotation with the hub 178a, 178b, and a second constant-velocity joint 198 coupling the second end of the axle shaft 190 with the output shaft. As such, torque is transferred from the differential through the stub axle 186, the first constant-velocity joint 194, the axle shaft 190, the second constant-velocity joint 198, and the output shaft of the respective assemblies 174a, 174b before reaching the hubs 178a, 178b and the respective rear wheels of the vehicle.

With reference to FIGS. 1-3, the kit 10 also includes a first rotor 202a coupled for co-rotation with the first stub-axle assembly 174a and a second rotor 202b coupled for co-rotation with the second stub-axle assembly 174b. The rotors 202a, 202b are positioned between the stub axle 186 and the first constant-velocity joint 194 in each of the stub axle assemblies 174a, 174b. Therefore, the rotors 202a, 202b are located inboard of the respective uprights 138a, 138b such that the rotors 202a, 202b do not contribute to the sprung mass of the kit 10. In other words, the rotors 202a, 202b are not moved upwardly and downwardly with the rear wheels and uprights 138a, 138b when the vehicle is in operation. Conventional threaded fasteners are used to secure the first rotor 202a between the first constant-velocity joint 194 and the stub axle 186 of the first stub axle assembly 174a. Likewise, conventional threaded fasteners are used to secure the second rotor 202b between the first constant-velocity joint 194 and the stub axle 186 of the second stub axle assembly 174b.

With reference to FIGS. 1 and 3, the kit 10 further includes first and second calipers 206a, 206b mounted to the differential housing 42 which, when actuated, apply a braking force on the first and second rotors 202a, 202b to decelerate the rotation of the stub axle assemblies 174a, 174b to bring the vehicle to a stop. Respective caliper mounts 210a, 210b are fastened to the differential housing 42 to which the first and second calipers 206a, 206b are fastened (FIG. 3).

With reference to FIG. 2, the kit 10 also includes a first strut rod 214a configured to interconnect the first lower control arm 122a and the chassis 18, and a second strut rod 214b configured to interconnect the second lower control arm 122b and the chassis 18. Both of the strut rods 214a, 214b extend toward the front of the vehicle's chassis 18 (FIG. 4) and are operable to transfer the propulsion forces resulting from the contact between the vehicle's rear wheels and the driving surface to the vehicle's chassis 18. In the illustrated embodiment of the kit 10, the strut rods 214a, 214b extend in a direction substantially parallel to the length of the vehicle. Alternatively, depending upon the particular configuration of the vehicle's chassis 18, the strut rods 214a, 214b may be obliquely oriented with respect to a central axis of the chassis 18.

With continued reference to FIG. 4, the kit 10 further includes first and second sub-frame connectors 218a, 218b configured to interconnect a front sub-frame 222 and the rear sub-frame 22 of the vehicle's chassis 18. The first strut rod 214a includes opposed ends pivotably coupled to the first sub-frame connector 218a and the first lower control arm 122a, respectively. Likewise, the second strut rod 214b includes opposed ends pivotably coupled to the second sub-frame connector 218b and the second lower control arm 122b, respectively. The sub-frame connectors 218a, 218b each include an offset strut mount 226 to which the respective strut rods 214a, 214b are pivotably coupled. The lower control arms 122a, 122b also each include a strut mount 230 to which the respective strut rods 214a, 214b are pivotably coupled.

In operation of a vehicle using the independent rear suspension kit 10 described above, the vehicle's rear wheels are substantially isolated from each other such that an input to the suspension system by one of the wheels (e.g., a jouncing motion) does not affect the other of the wheels. Consequently, the handling characteristics of the vehicle may be improved by using the kit 10 in place of the solid-axle suspension system originally equipped in the vehicle.

Various features of the invention are set forth in the following claims.

What is claimed is:

1. An independent rear suspension kit for a vehicle, the kit comprising:
   first and second mounting brackets configured to be fastened to a chassis of the vehicle;
   a cross-member separate from and interconnecting the first and second brackets;
   a differential housing secured to the cross-member, the differential housing having first and second arms extending therefrom;
   first and second upper control arms pivotably coupled to the cross-member;
   first and second lower control arms pivotably coupled to the first and second arms, respectively, of the differential housing;
   a first upright pivotably coupled to the first upper control arm and the first lower control arm; and
   a second upright pivotably coupled to the second upper control arm and the second lower control arm.

2. The independent rear suspension kit of claim 1, further comprising:
   a first suspension member interconnecting the cross-member and the first lower control arm; and
   a second suspension member interconnecting the cross-member and the second lower control arm.

3. The independent rear suspension kit of claim 2, wherein the first and second suspension members are each configured as coil-over shocks.

4. The independent rear suspension kit of claim 1, further comprising:
   a first stub axle assembly extending between the first upright and the differential housing; and
   a second stub axle assembly extending between the second upright and the differential housing.

5. The independent rear suspension kit of claim 4, further comprising:
   a first rotor coupled for co-rotation with the first stub-axle assembly;
   a first caliper mounted to the differential housing and configured to apply a braking force on the first rotor;

a second rotor coupled for co-rotation with the second stub-axle assembly; and a second caliper mounted to the differential housing and configured to apply a braking force on the second rotor.

6. The independent rear suspension kit of claim 5, further comprising:
a first caliper mount fastened to the differential housing to which the first caliper is fastened; and
a second caliper mount fastened to the differential housing to which the second caliper is fastened.

7. The independent rear suspension kit of claim 5, wherein the first rotor is coupled to the first stub-axle assembly inboard of the first upright, and wherein the second rotor is coupled to the second stub-axle assembly inboard of the second upright.

8. The independent rear suspension kit of claim 4, wherein the first and second stub axle assemblies each include
a stub axle having a first end and a second end;
a first constant-velocity joint coupled to the first end of the stub axle; and
a second constant-velocity joint coupled to the second end of the stub axle.

9. The independent rear suspension kit of claim 8, wherein the first constant-velocity joint of each of the first and second stub axle assemblies are configured to interconnect with a differential at least partially received within the differential housing to receive torque from the differential, and wherein the rear suspension kit further includes
a first hub rotatably supported by the first upright and interconnected with the second constant-velocity joint of the first stub axle assembly to receive torque from the second constant-velocity joint of the first stub axle assembly, and
a second hub rotatably supported by the second upright and interconnected with the second constant-velocity joint of the second stub axle assembly to receive torque from the second constant-velocity joint of the second stub axle assembly.

10. The independent rear suspension kit of claim 1, further comprising a saddle separate from the cross-member and including opposed first and second ends interconnecting the first and second brackets, respectively, and a middle portion coupled to the differential housing.

11. The independent rear suspension kit of claim 10, wherein the first and second lower control arms are each pivotably coupled to the middle portion of the saddle.

12. The independent rear suspension kit of claim 1, further comprising:
a first strut rod configured to interconnect the first lower control arm and the chassis and extending toward the front of the chassis; and
a second strut rod configured to interconnect the second lower control arm and the chassis and extending toward the front of the chassis.

13. The independent rear suspension kit of claim 12, further comprising:
a first sub-frame connector configured to interconnect at least a first sub-frame and a second sub-frame of the chassis; and
a second sub-frame connector configured to interconnect the first sub-frame and the second sub-frame.

14. The independent rear suspension kit of claim 13, wherein the first strut rod includes opposed ends pivotably coupled to the first sub-frame connector and the first lower control arm, respectively, and wherein the second strut rod includes opposed ends pivotably coupled to the second sub-frame connector and the second lower control arm, respectively.

15. The independent rear suspension kit of claim 1, wherein the first and second arms are integrally formed with the differential housing as a single piece.

16. The independent rear suspension kit of claim 1, further comprising a tie link interconnecting the first and second arms.

17. The independent rear suspension kit of claim 1, wherein the differential housing includes a plurality of threaded holes, and wherein a corresponding plurality of threaded fasteners are received in the threaded holes to support the differential housing from the cross-member.

18. The independent rear suspension kit of claim 1, wherein the length of each of the first and second upper control arms is adjustable to adjust a camber angle of the first and second uprights, respectively.

19. The independent rear suspension kit of claim 1, wherein each of the first and second brackets includes a mount, and wherein opposed ends of the cross-member are fastened to the respective mounts of the first and second brackets.

20. The independent rear suspension kit of claim 1, wherein each of the first and second lower control arms includes an adjustable length for adjusting track width and toe of the vehicle.

* * * * *